3,321,459
DISPERSE MONOAZO DYES
Jacques Voltz and Werner Bossard, Riehen, Switzerland, assignors to J. R. Geigy, A.-G., Basel, Switzerland
No Drawing. Filed Oct. 31, 1963, Ser. No. 320,530
Claims priority, application Switzerland, Oct. 31, 1962, 12,764/62
6 Claims. (Cl. 260—207)

The present invention concerns new water-dispersible monoazo dyestuffs, processes for the production thereof, processes for the dyeing of organic hydrophobic material using the new dyestuffs and, as industrial product, the material dyed with the aid of these dyestuffs.

It is an object of the invention to provide new water-dispersible dyestuffs which afford dyeings on organic hydrophobic materials, and especially on hydrophobic polyester textile materials, which possess better fastness to sublimation than known dyestuffs of the monoazo class, and which show, at the same time, little or no decrease in drawing power on such fibers.

The aforesaid objects, as well as others which will become apparent as the description of this invention proceeds, have been attained by this invention, which comprises novel water-dispersible monoazo dyestuffs of the formula

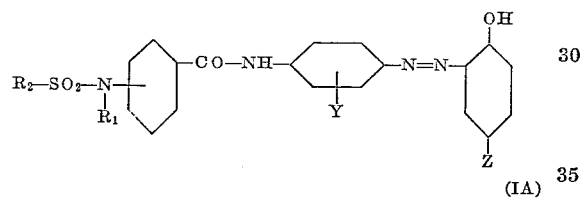

wherein $R_1$ represents hydrogen, a lower alkyl group which can be of straight- or branched-chain, a halogen-, preferably chlorine- but also bromine- or fluorine-, cyano-, hydroxyl- or lower alkoxy-substituted lower alkyl radical of at least 2 carbon atoms, a benzyl group, preferably unsubstituted or lower alkyl-substituted, or a phenyl group which is preferably unsubstituted or substituted by lower alkyl or lower alkoxy, or by halogen, preferably chlorine or bromine.

$R_2$ represents an unsubstituted lower alkyl group or a lower alkyl group of at least 2 carbon atoms which is substituted by halogen, preferably chlorine or bromine or lower alkoxy groups or a phenyl group which may be substituted by lower alkyl or lower alkoxy radicals or by halogen, preferably chlorine or bromine.

Y represents preferably hydrogen, or chlorine, bromine, lower alkyl, or lower alkoxy, preferably methoxy, and Z represents lower alkyl, preferably with not more than 2 carbon atoms, chlorine or bromine.

Particularly good results are obtained with dyestuffs of the formula

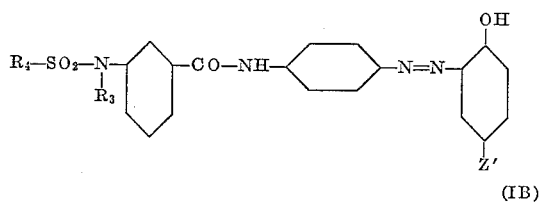

wherein each of $R_3$ and $R_4$ represents lower alkyl, and $Z'$ represents methyl, ethyl or chlorine.

"Lower" used in this specification and the appended claims in connection with aliphatic radicals means radicals of from 1 to 4 carbon atoms, unless stated otherwise.

The radicals $R_3$ and $R_4$ in Formula IB are preferably lower alkyl groups, in particular methyl or ethyl groups.

The good reserve of cotton and the like fibers shown by the dyestuffs of Formula IA makes them very well suited for the dyeing of blends of polyester textile materials or polyamide fibers such as wool with cotton.

The good drawing power of the dyestuffs of Formula IA, particularly on polyester fibers, is particularly surprising, since it is well known that introduction of sulfonylamino groups into disperse azo dyestuffs of the general class to which the dyestuffs of Formula I pertain, leads to a marked deterioration of drawing power.

The dyestuffs of Formula IA as well as other structurally related dyestuffs, are produced by coupling the diazonium compound of an amine of the formula

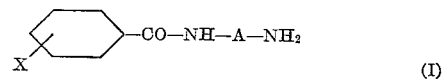

with a para-substituted hydroxybenzene coupling in o-position to the hydroxyl group, to form monoazo compounds of formula

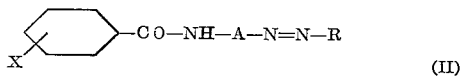

In these formulas, X represents a sulfonylamino group of the formula

$R_1'$ and $R_2'$ having the meaning given further below derived from a primary or secondary amine, R represents the radical of a para-substituted hydroxybenzene coupled in o-position to the hydroxyl group, and A represents a p-phenylene radical which can contain the substituents conventional in azo dyestuffs, the components, however, being so chosen that the monoazo dyestuff of Formula II contains no water-solubilizing groups which dissociate acid in water.

In Formula III, $R_1'$ represents hydrogen, a lower alkyl group of normal or branched chain, which is unsubstituted or substituted by halogen, especially chlorine or bromine, cyano, hydroxyl or lower alkoxy groups, a benzyl or phenyl group which is unsubstituted or substituted by lower alkyl or lower alkoxy radicals or by halogen atoms.

More particularly, $R_1'$ represents a hydrogen atom, a lower alkyl radical such as the methyl, ethyl, propyl, isopropyl, butyl or isobutyl group, or also lower alkyl radical substituted as defined above, such as the β-hydroxyethyl, γ-hydroxypropyl, β-methoxyethyl, β-ethoxyethyl, γ-methoxypropyl, or γ-ethoxypropyl group.

The radical $R_2'$ is a lower alkyl group such as methyl or ethyl, phenyl or a phenyl radical, which is substituted as defined above, such as methylphenyl, methoxyphenyl or chlorophenyl.

The group X can be in the o-, m- or p-position to the carbonamide group. For technical reasons, however, the meta position is preferred.

In the production of the compounds of Formula II, the phenylene radical A bound in 1,4-position can contain other substituents conventional in azo dyestuffs of the type described, for example, halogen atoms such as fluorine, chlorine or bromine, alkyl groups such as the methyl or ethyl radicals, alkoxy groups such as the methoxy or ethoxy radicals, or also nitro groups.

As substituents in the p-position to the hydroxy groups, the radical R contains, for example, alkyl groups such as the methyl, ethyl, propyl, isopropyl, butyl, tert. butyl or amyl group, halogen atoms such as chlorine or bromine, alkoxy radicals such as methoxy or ethoxy groups, aralkyl radicals such as the benzyl group, and aryl radicals such as the phenyl or methylphenyl group. Thus, for example, 1 - hydroxy - 4-methylbenzene, 1-hydroxy-4-ethylbenzene, 1-hydroxy-4-propylbenzene, 1-hydroxy-4-isopropylbenzene, 1-hydroxy-4-butylbenzene, 1-hydroxy-4-tert. butylbenzene, 1-hydroxy-4-amylbenzene, 1-hydroxy-4-benzylbenzene, 1-hydroxy-4-cyclohexylbenzene, 1-hydroxy-4-phenylbenzene, 1-hydroxy-4-(4'-methoxyphenyl)-benzene, 1-hydroxy-4-(4'-chlorophenyl)-benzene are used as coupling components. 1-hydroxy-4-alkylbenzenes such as 1-hydroxy-4-methylbenzene, are preferred.

The amines of the general Formula I used as starting materials are obtained, for example, by reduction of nitro compounds of the formula

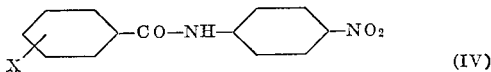

which are obtained by condensation of 2-, 3- or 4-sulfonylamino-benzoic acid halides with 1-amino-4-nitrobenzene. This condensation is performed in the usual manner.

The diazotized amines of Formula I are coupled with the para-substituted hydroxybenzenes preferably in an alkaline aqueous medium. The difficultly water-soluble dyestuffs are isolated by filtration. If desired, a suitable diazonium compound can also be coupled simultaneously with a mixture of two or more coupling components usable according to the invention.

A modification of the process for the production of monoazo dyestuffs which are difficultly soluble in water consists in condensing an aminoazo compound of the formula $$H_2N-A-N=N-R \qquad (V)$$

with a reactive functional derivative of a benzene carboxylic acid of the formula

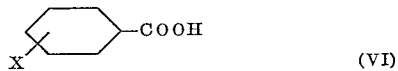

to form monoazo dyestuffs of Formula II, the components being so chosen that the monoazo dyestuff II contains no water-solubilizing group which dissociate acid in water.

The remarks regarding A, R and X in the first process are also valid for this process.

Suitable reactive functional derivatives of benzene carboxylic acids of Formula VI are preferably their halides such as the chlorides or bromides. The reaction of these compounds with the aminoazo compounds of the Formula V is preferably performed in solution in an indifferent organic solvent such as benzene, toluene, xylenes, cholobenzene, dichlorobenzene, pyridine, ethylmethyl ketone etc. or also in a very fine aqueous suspension, preferably in the presence of a proton acceptor such as sodium acetate or pyridine. The reaction temperature can vary within wide limits depending on the reaction conditions. The dyestuffs are isolated by filtration, concentration of the solvent or precipitation from the solvent with suitable agents in the usual manner.

The dyestuffs of Formula II according to the invention are capable of dyeing hydrophobic synthetic organic textile fibers from aqueous dispersion, e.g. they can be used for the dyeing of cellulose di- to tri-acetate, particularly, however, for the dyeing of high molecular esters of aromatic polycarboxylic acids with polyfunctional alcohols such as glycol terephthalate Terylene, Dacron, Tergal, Trevira or Kodel.

The dyestuffs can also be used for the dyeing of synthetic polyamide fibers such as nylon, or of Perlon.

Polyester fibers are dyed with aqueous dispersions of dyestuffs according to the invention, preferably at temperatures of over 100° C. under pressure. The dyeing, however, can also be performed at the boiling point of the dyebath in the presence of carriers such as phenylphenols, polychlorobenzene compounds or similar auxiliaries. In individual cases, the drawing power of the dyestuffs can be further improved by mixing two or more of the monoazo dyestuffs according to the invention.

The yellow dyeings produced on polyester fibers with the dyestuffs according to the invention are distinguished by their excellent wet and light fastness properties. In contrast to the monoazo dyestuffs of similar structure disclosed in the French Patent No. 936,714, particularly the new dyestuffs of Formula IA have excellent sublimation fastness properties.

The following non-limitative examples illustrate the invention further. Where not otherwise expressly stated, parts and percentages are given by weight. The temperatures are in degrees centigrade. The relationship of parts by weight to parts by volume is as that of grams (g.) to milliliters (ml.).

*Example 1*

24.3 parts of 2-hydroxy-5-methyl-4'-amino-1,1'-azobenzene and 26.6 parts of 3-(methylsulfonyl-N-methylamino)-benzoic acid chloride are dissolved in 150 parts of anhydrous pyridine while stirring and cooling well. The reaction mixture is heated to 90–100° within 1 hour and is then kept for another two hours at this temperature. When no more starting dyestuff can be traced, the reaction mass is cooled and poured into 1000 parts of water. The suspension so formed is acidified with concentrated hydrochloric acid and the dyestuff is filtered off, washed with a lot of water and dried in vacuo.

It dissolves in dimethyl formamide and in concentrated sulfuric acid with a yellow color and corresponds to the formula

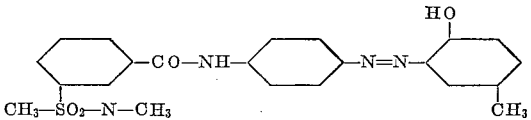

It melts at 103–105°.

A dye preparation, which contains the dyestuff in fine distribution and which is milled with a naphthalene sulfonic acid/formaldehyde condensation product, dyes polyglycol terephthalate fibers such as Tergal, in yellow shades from an aqueous dispersion, possible in the presence of a carrier. The dyeings are fast to washing, light and sublimation.

3-(methylsulfonyl-N-methylamino)-benzoic acid chloride is obtained, for example, as follows: 3-aminobenzoic acid is reacted with methylsulfonic acid to form the corresponding methyl sulfonamide and this is methylated with dimethyl sulfate to form 3-(methylsulfonyl-N-methylamino)-benzoic acid. The corresponding acid chloride is obtained finally with the use of thionyl chloride.

Similar dyestuffs are obtained under the conditions given in the example if equivalent amounts of the benzoic acid chloride derivatives given in column 2 of the following table are condensed with corresponding amounts of the aminoazo dyestuffs given in column 3.

| Example No. | Benzoic acid chloride derivative | Aminoazo dyestuff | Shade on polyester fibers |
|---|---|---|---|
| 2 | 3-(ethylsulfonyl-N-methylamino)-benzoic acid chloride. | 2-hydroxy-5-methyl-4'-amino-1,1'-azo-benzene. | Yellow. |
| 3 | 3-(phenylsulfonylamino)-benzoic acid chloride. | 2-hydroxy-5-butyl-4'-amino-1,1'-azo-benzene. | Do. |
| 4 | 3-(phenylsulfonyl-N-methylamino)-benzoic acid chloride. | 2-hydroxy-5-methyl-4'-amino-1,1'-azo-benzene. | Do. |
| 5 | 3-(methylsulfonyl-N-methylamino)-benzoic acid chloride. | 2-hydroxy-5-methoxy-4'-amino-1,1'-azo-benzene. | Do. |
| 6 | 4-(methylsulfonyl-N-methylamino)-benzoic acid chloride. | 2-hydroxy-5-isopropyl-4'-amino-1,1'-azo-benzene. | Do. |
| 7 | 4-(phenylsulfonyl-N-methylamino)-benzoic acid chloride. | 2-hydroxy-5-chloro-4'-amino-1,1'-azo-benzene. | Do. |
| 8 | 4-(phenylsulfonylamino)-benzoic acid hloride. | 2-hydroxy-5-butyl-4'-amino-1,1'-azo-benzene. | Do. |
| 9 | 2-(methylsulfonyl-N-methylamino)-benzoic acid chloride. | 2-hydroxy-5-methyl-4'-amino-1,1'-azo-benzene. | Do. |
| 10 | 2-(ethylsulfonyl-N-methylamino)-benzoic acid chloride. | 2-hydroxy-5-methoxy-4'-amino-1,1'-azo-benzene. | Do. |

Example 11

7 parts of finely milled 1-amino-4[3'-(methylsulfonyl-N-methylamino)-benzoylamino]-benzene are pasted in a mixture of 150 parts of water and 10 parts of concentrated hydrochloric acid and the slurry is diazotized in the usual way at 0–5°. The clarified diazo solution is added dropwise at 0–5° to a solution of 2.8 parts of 1-hydroxy-4-methylbenzene in 100 parts of water, 0.1 part of sodium hydroxide and 0.8 part of sodium carbonate. On completion of the coupling, the yellow dyestuff which precipitates is filtered off under suction, washed with a great deal of water and dried in vacuo. The monoazo dyestuff so obtained is identical with that obtained according to Example 3.

The 1-amino-4-[3'-(N-methylsulfonyl-N-methylamino)-benzoylamino]-benzene used as diazo component is obtained from 3-(N-methylsulfonyl-N-methylamino)-benzoic acid chloride and 1-amino-4-nitrobenzene followed by reduction of the condensation product to form the corresponding amine.

Dyestuffs having similar dyeing properties are obtained if, instead of 7 parts of 1-amino-4-[3'-(N-methylsulfonyl-N-methylamino)-benzoylamino]-benzene, equivalent amounts are used of:

| Example No. | | Shade on polyester fibers |
|---|---|---|
| 12 | 1-amino-4-[3'-(N-ethylsulfonyl-N-methylamino)-benzoylamino]-benzene. | Yellow. |
| 13 | 1-amino-4-[3'-(N-isopropylsulfonylamino)-benzoylamino]-benzene. | Do. |
| 14 | 1-amino-4-[3'-(N-tert. butyl-sulfonylamino)-benzoylamino]-benzene. | Do. |
| 15 | 1-amino-4-[3'-(N-n-hexylsulfonylamino)-benzoylamino]-benzene. | Do. |
| 16 | 1-amino-4-[3'-(N-phenylsulfonyl-N-methylamino)-benzoylamino]-benzene. | Do. |
| 17 | 1-amino-4-[3'-(N-phenylsulfonylamino)-benzoylamino]-benzene. | Do. |
| 18 | 1-amino-4-[4'-(N-phenylsulfonyl-N-methylamino)-benzoylamino]-benzene. | Do. |
| 19 | 1-amino-4-[4'-(N-methylsulfonyl-N-methylamino)-benzoylamino]-benzene. | Do. |
| 20 | 1-amino-4-[2'-(N-methylsulfonyl-N-methylamino)-benzoylamino]-benzene. | Do. |

Example 21

3 parts of the dyestuff obtained according to Example 1 are dispersed in 4000 parts of water. 25 parts of the sodium salt of o-phenylphenol and 25 parts of diammonium phosphate are added to this dispersion and 100 parts of polyglycol terephthalate yarn are dyed therein for 90 minutes at 95–98°. The dyeing is rinsed and after-treated with sodium hydroxide solution and a fatty alcohol/polyethylene oxide condensation product. Under these conditions, a pure yellow dyeing is obtained which has very good fastness to sublimation and light.

Example 22

2 parts of the dyestuff obtained according to Example 3 are finely suspended in 2000 parts of water which contains 4 parts of a formaldehyde/naphthalene sulfonic acid condensation product. The suspension is prepared in a pressure dyeing apparatus. The pH of the dyebath is adjusted to 6–6.5 with acetic acid. 100 parts of polyglycol terephthalate yarn are entered at 50°, the bath is heated to 120° within 30 minutes and the yarn is dyed for 50 minutes at this temperature. The dyed goods are then rinsed with water, soaped and dried. Under these conditions a pure yellow dyeing is obtained which is fast to washing, rubbing, light and sublimation.

The dyestuffs described in the other examples produce dyeings of equal quality by this process.

Example 23

Polyglycol terephthalate fabric such as "Dacron" of E. I. du Pont, is impregnated on a pad mangle at 40° with a liquor of the following composition:

20 parts of the dyestuff obtained according to Example 1, finely dispersed in—

7.5 parts of sodium alginate,
20 parts of triethanolamine,
20 parts of a fatty alcohol/polyethylene oxide condensation product, and
900 parts of water.

The fabric is squeezed out to 100% content, dried at 100° and then the dyeing is fixed for 30 seconds at a temperature of 210°. The dyed goods are rinsed with water, soaped and dried. Under these conditions, a yellow dyeing is obtained which is fast to washing, rubbing, light and sublimation.

The dyestuffs described in the other examples produce dyeings of equal quality by this process.

We claim:
1. A disperse dyestuff of the formula

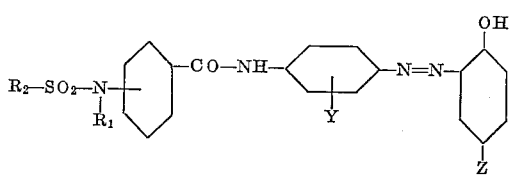

wherein:
$R_1$ is a member selected from the group consisting of hydrogen, lower alkyl, halo-lower alkyl, cyano-lower alkyl, hydroxy-lower alkyl of at least 2 carbon atoms, lower alkoxy-lower alkyl wherein the "alkyl" moiety has at least two carbon atoms,
$R_2$ is a member selected from the group consisting of lower alkyl, halo-lower alkyl, lower alkoxy-alkyl wherein the "alkyl" moiety has at least two carbon atoms, phenyl, lower alkyl-phenyl, lower alkoxy-phenyl, chlorophenyl and bromophenyl, Y is a member selected from the group consisting of hydrogen, chlorine, bromine, lower alkyl and lower alkoxy, and Z is a member selected from the group consisting of lower alkyl, chlorine and bromine.

2. The compound of the formula

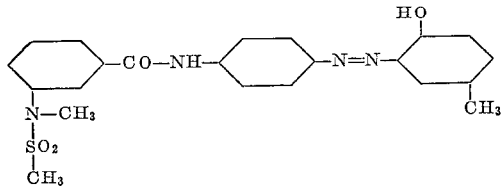

3. The compound of the formula

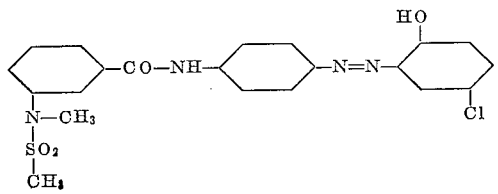

4. The compound of the formula

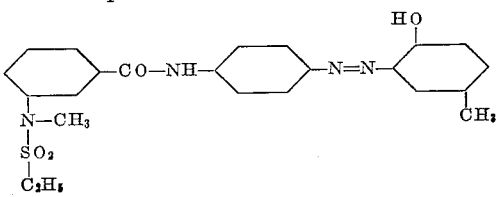

5. The compound of the formula

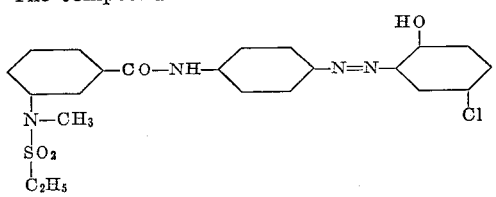

6. The compound of the formula

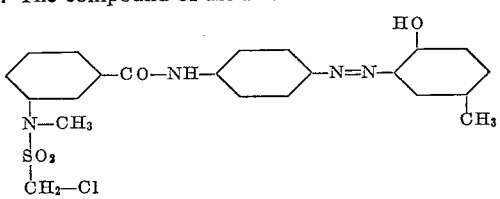

No references cited.

CHARLES B. PARKER, *Primary Examiner.*

D. M. PAPUGA, *Assistant Examiner.*